United States Patent [19]

Ahlgren

[11] 4,065,583
[45] Dec. 27, 1977

[54] METHOD OF COOKING AN ITEM OF FOOD, USING A FOOD SHEET AND AN OPEN BOTTOMED PAN

[75] Inventor: David William Ahlgren, Duluth, Minn.

[73] Assignee: Jeno F. Paulucci, Duluth, Minn.

[21] Appl. No.: 687,926

[22] Filed: May 19, 1976

[51] Int. Cl.² .............................................. A21D 8/06
[52] U.S. Cl. .................................... 426/243; 426/107; 426/113; 426/128; 426/505; 426/523
[58] Field of Search ............... 426/113, 114, 128, 115, 426/234, 107, 243, 237, 132, 394, 397, 392, 523, 505, 496, 502; 99/450, DIG. 15; 126/390

[56] References Cited

U.S. PATENT DOCUMENTS

| | | | |
|---|---|---|---|
| 1,316,365 | 9/1919 | Jackson et al. | 99/DIG. 15 |
| 3,347,181 | 10/1967 | Pizzo | 99/450 X |
| 3,548,736 | 12/1970 | Wahl | 99/450 X |
| 3,861,576 | 1/1975 | Tolaas et al. | 426/128 X |
| 3,899,962 | 8/1975 | Federico | 99/450 X |
| 3,962,961 | 6/1976 | Peters | 99/450 X |

FOREIGN PATENT DOCUMENTS 680,654 1/1930 France ................................. 426/397

Primary Examiner—S. Leon Bashore
Assistant Examiner—Kenneth M. Schor
Attorney, Agent, or Firm—Henry C. Kovar

[57] ABSTRACT

A food cooking sheet made of flexible metal foil is disclosed, the sheet has an imperforate annular margin forming the outer periphery of the sheet and there is a plurality of webs extending across a perforated center section, the webs structurally connect opposite sides of the margin and radiant heat may be upwardly directed between the webs for browning an item of food supported on the sheet; also disclosed is a method of cooking an item of food, the method involves the use of a perforated sheet of metal foil and a rigid open-bottomed pan for supporting the foil and an item of food atop the foil, and the application of radiant heat through the perforated foil sheet directly against the bottom of a food item, and the removal of the foil sheet and food item together from the pan after cooking.

4 Claims, 6 Drawing Figures

U.S. Patent   Dec. 27, 1977   Sheet 2 of 2   4,065,583
FIG.3
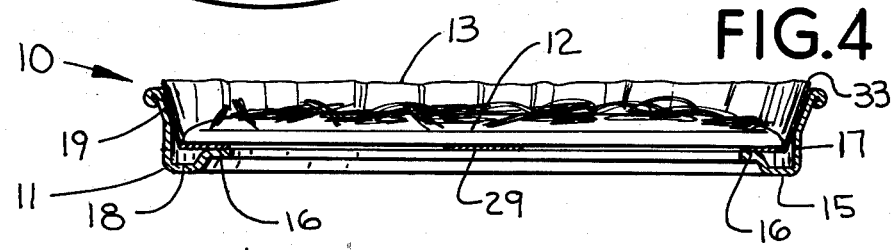
FIG.4
FIG.5
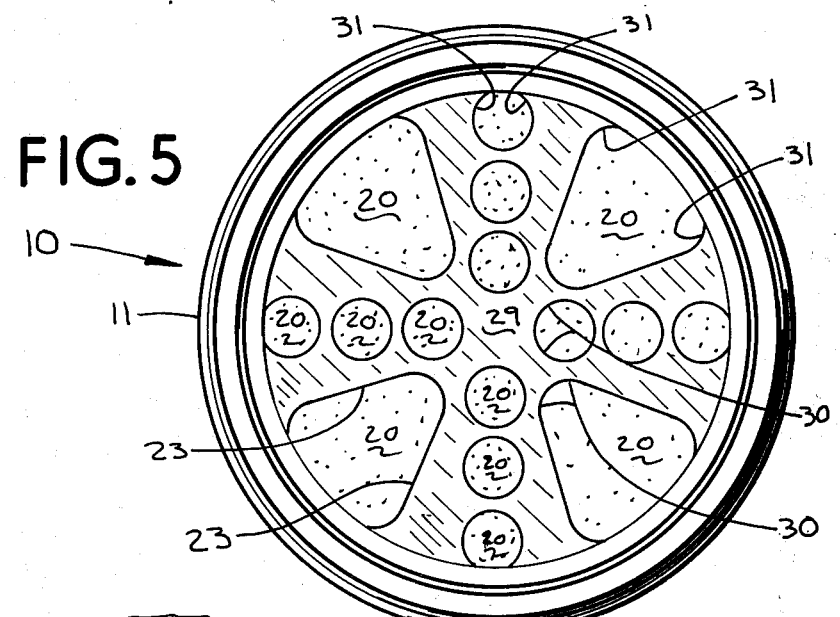
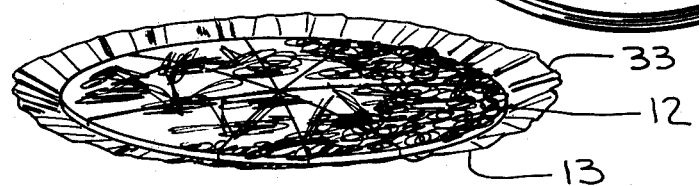
FIG.6

METHOD OF COOKING AN ITEM OF FOOD, USING A FOOD SHEET AND AN OPEN BOTTOMED PAN

BACKGROUND OF THE INVENTION

1. FIELD OF THE INVENTION

This invention pertains to a method of cooking an item of food using a perforate sheet of foil and rigid open-bottom pan.

2. THE PRIOR ART

Hot food articles, such as pizzas, are frequently prepared at the place of consumption, and the article may be sized to constitute a single serving. It has been found that in attempting to bake such articles rapidly, there is a tendency for the baking to be uneven. This problem is heightened by the fact that the same equipment will typically be used for baking a pizza that begins in the frozen state as well as one that begins in the unfrozen state, and of course, the degree of freezing can vary from point to point on a particular pizza, thereby causing uneven rising, uneven baking and uneven browning, and in some instances even causing burning before the article is ready for consumption. There can be superficial overcooking with inadequate rising of dough. To resolve such problems, in the past, a separate oven has been utilized to thaw the dough before baking, and such an arrangement becomes burdensome in that the operator needs to use two ovens, needs to have multiple opening and closing of doors, and is placed at a disadvantage in needing to estimate baking time.

A concept for solution to the foregoing heating problem is provided by the oven of U.S. Pat. No. 3,847,069. This oven has a vertical axis helical track of several levels with electric heating elements in between the track levels and a rotatable reel for advancing circular food packages down the track and over the heating elements.

An important feature of U.S. Pat. No. 3,847,069, is the provision of an open-bottomed pan or tray having an annular rim with an inner and outer periphery raised up off the bottom of the rim. The inner periphery supports an item of food in the tray and the outer periphery extends upward to a level above the inner periphery for retaining a food item in the pan and on the inner periphery. Between the inner and outer peripheries there is provided a depressed gutter for collecting and trapping juices and cooking run off from a food item being cooked in the pan.

The pan disclosed in U.S. Pat. No. 3,847,069 is known to operate as described therein and to be very useful for cooking.

However, because the pan itself collects and traps the run off and drainage from a food item being cooked, the pan needs cleaning between each use. The pan is very difficult to clean because of the recess in which the cooking drainage collects and further the drainage tends to char just like the black deposits on a conventional oven broiling pan and it will be appreciated that these deposits must almost always be manually removed with cleanser, steel wool or other abrasive cleaning procedures.

Another severe problem encountered with the pan or tray of U.S. Pat. No. 3,847,069 is that when the tray and food item are discharged from an oven, the tray will be at about 600° F. (315° C.) and is absolutely impossible to touch. The only method possible for removal of the cooked food item, and it is necessary to remove the food immediately to keep it from cooling off, is to use a pliers-type tool and to flop the cooked food item out of the tray much like flopping a pancake out of a frying pan. People attempting to use this tray and method are always in danger of being burned and the hazard is considered excessive and commercially objectionable.

A further problem with the prior art is that the food item will sag downward through the open bottom of the tray and be scraped or burned by contact with and against the oven interior structure.

OBJECTS OF THE PRESENT INVENTION

It is an object of the present invention to provide an economical and disposable cooking sheet for an item of food.

It is another object of the present invention to provide a cooking sheet of perforated flexible foil which has sufficient structural strength to support and serve as a package for an article of food.

It is yet another object of the present invention to provide a disposable cooking sheet which is formable into a sanitary liner for a re-usable cooking pan.

It is a further object of the present invention to provide a liner for a cooking pan, which together with the pan forms an open-bottom cooking support enabling re-use of the pan without requiring washing of the pan.

It is yet a further object of the present invention to provide a flexible cooking sheet which is supportable in an open-bottomed pan and is easily removable from a hot pan together and with a hot food article.

Another important object of the present invention is the provision of a method of cooking an article of food without grease or food releases, which method does not require cleaning of cookware.

A further important object of the present invention is to provide a simple and minimal cost method of cooking and serving an item of food in which the method makes use of a disposable foil cooking sheet supported in a rigid open-bottom cooking pan.

Many other advantages, features and additional objects of the present invention will become manifest to those versed in the art upon making reference to the detailed descriptions and to the accompanying sheets of drawings in which a preferred structural embodiment incorporating the principles of the present invention is shown by way of illustrative example.

SUMMARY OF THE INVENTION

According to this invention, a food cooking sheet of flexible foil is provided with an imperforate annular margin, a plurality of webs extending across a central portion of the sheet inside of the margin with the webs structurally connecting opposite sides of the margin, and apertures between the webs for passing radiant heat directed against the bottom of the sheet; another distinct aspect of the present invention is a method of cooking an item of food in which the food is placed upon a perforated sheet of foil, the food and foil sheet are placed together into a rigid open-bottomed cooking pan for forming a package, the package is then run through an oven, and the foil sheet and food are removed together from the pan after cooking of the food.

ON THE DRAWINGS

FIG. 3 is a top view of the structures of FIG. 1 combined together into a package for cooking of the food item;

FIG. 4 is an elevational sectional view of the package of FIG. 3;

FIG. 5 is a bottom view of the structure of FIG. 3; and

FIG. 6 is an elevational perspective view of the food item and foil cooking sheet of FIG. 1 after the food item has been cooked.

Figure 1:
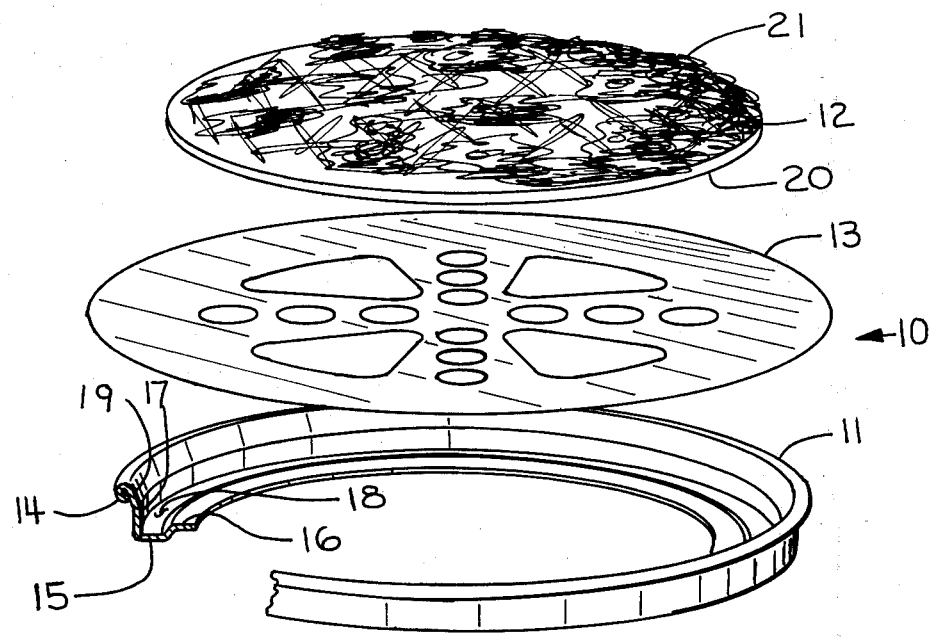
FIG. 1 is an elevational perspective exploded view of an item of food, a foil food cooking sheet according to the present invention, and a cooking pan, all combinable together into a package for cooking of the food item.

AS SHOWN ON THE DRAWINGS:

The principles of the present invention are particularly useful when embodied in a package of food of the type illustrated in FIG. 1 and generally indicated by the numeral 10. The package 10 is formed of a rigid open-bottom pan 11, an item of food 12, and a flexible metal foil cooking sheet 13 which supports the food item 12 when the pan 11, sheet 13 and food item 12 are assembled together forming a package for placement in an oven (not shown) for cooking of the food item 12.

The pan 11 is made of a rigid material, the preferred example of which is stainless steel of about one mm thick, and has an annular outer rim 14 and an open center section as is best shown in the partial section of FIG. 1 which gives the pan 11 the shape and form of a ring. The rim 14 has a downward facing annular bottom 15 upon which the pan 11 sits for support, an upward facing annular support surface 16 for supporting the foil sheet 13 and food item 12, and an outer peripheral flange 17 which projects upward on and around the ouside of pan 11 for positioning a food item 12 on the support surface 16 as will be explained. The support surface 16 is raised up to a higher level than the pan bottom 15 for supporting the foil sheet 13 and food item 12 above any surface upon which the package 10 may be placed. Between the outer flange 17 and the support surface 16 there is a depressed relief or gutter 18 which is also lower than the support surface 16. The outer flange 17 has a frusto-conical tapered entry 19 which enables nesting or stacking of a plurality of pans 11 one atop another.

The food item 12 for which the present apparatus and method for cooking are particularly useful and advantageous has a bottom 20 with a bread or crust of some type which may be made of such things as wheat, corn, potato, rice or the like. The bottom 20 may be either relatively hard or soft, specific contrasting examples of which are a tostado shell as compared to a slice of fresh bread. The food item 12 may have a topping 21 which could also be a filling if the bottom 20 were cup-shaped. The topping 21 may be one of tomato, cheese, meat, egg, fish, vegetable, fruit, or the like. Some specific examples of food item 12 are pizza, tostadoes, omelet sandwiches, fruit pies, vegetable and/or meat pies. These food items 12 are typically characterized as having a bottom 20 which is non-fluid and will not drip while being cooked whereas the filling or topping 21 may be very fluid when heated and tend to drip or run off of the bottom 20. The bottom 20 is of a type which usually is preferred browned and crispy when served.

One of the important aspects of the present invention is the geometric construction of the foil cooking sheet 13. As is apparent from the illustrations the foil sheet 13, pan 11 and food item 12 are all round. Alternate shapes such as square, rectangular, and special shapes are also usable in this invention. Regardless, the foil sheet 13 will be of a shape similar to the shape of the pan 11 and as used herein, the term annular applies to any shape be it round, square, rectangular, odd-shaped or the like not having a center portion.

Figure 2:
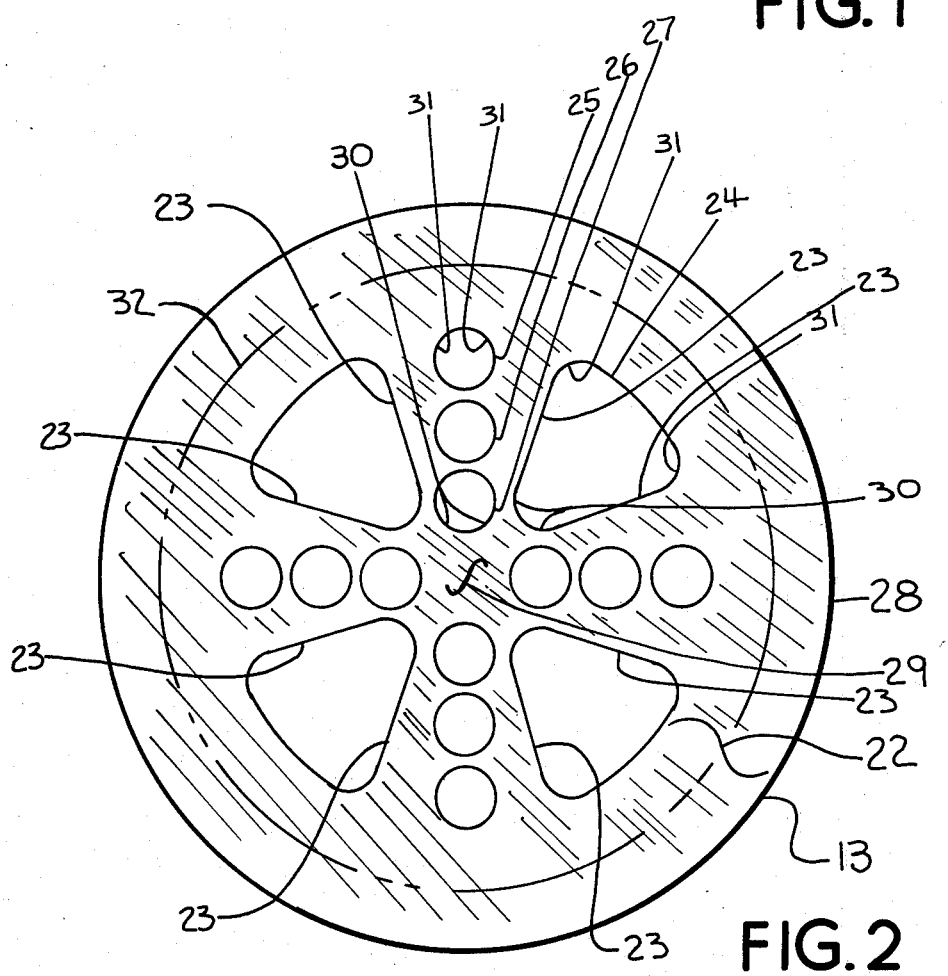
FIG. 2 is a top view of the foil food cooking sheet shown in FIG. 1.

The foil sheet 13, as best shown in FIG. 2, is made of a very thin flexible metal foil, a specific example of which is soft aluminum foil having a thickness of 0.001 inch (0.03 mm); this foil is generically referred to as either wrapping foil or aluminum foil. The foil sheet 13 has an imperforate annular margin 22 extending completely around the sheet 13 in a closed loop and forming the periphery of the sheet 13. Within the margin 22 there is a plurality of webs 23 which extend across the central portion of the sheet 13 inside of the margin 22, and the webs 23 structurally connect opposite facing sides of the margin 22 so that the sheet 13 can be grasped and pulled from opposite sides of the margin 22 without yielding distortion. There are apertures 24, 25, 26, 27 between the webs 23 which are for passage of radiant heat as will be subsequently explained. The margin 22 is of a constant width for the entire distance around the sheet 13 and the pattern formed by the webs 23 is positioned in the center of the outer peripheral edge 28 of the margin 22. The foil sheet 13 shown has a circular outer edge 28 and the webs 23 are arranged in a group or pattern concentric to the margin outer edge 28. The webs 23 are interconnected to each other at the center of the foil sheet 13. There is provided at the center of sheet 13, a hub 29 which interconnects the webs 28. The hub 29 is preferably imperforate for reasons to be later explained. There is provided a radius section 30 where each of the webs 23 joins to the hub 29; the radius section 30 is tangent to both the hub 29 and the respective web 23 into which it blends. There also is a radius section 31 joining each web 23 to the margin 22 and each of radius sections 31 is tangent to the margin 22 and to a respective web 23. The webs 23 are wider near the margin 22 than near the hub 29 and each web 23 extends generally radially inwardly from the margin 22 toward the center of the foil sheet 13. The webs 23 are sized to have a total area of less than half of the area of the central portion of the sheet 13 inside of the margin 22. An important feature of the margin 22 is that while it is initially flat, it is intended to be foldable into an inner flat annular portion and into a peripheral upright flange as will be explained.

The relative physical sizing of the pan 11, food item 12, and foil sheet 13 with respect to one another is very important. Specifically, the food item 12 is sized smaller than the pan 11 so that it will fit inside of outer peripheral flange 17 but the food item 12 is larger than the annular support 16 in pan 11. The foil sheet 13 is larger than the pan 11 although it is of the same shape as the pan 11. The margin 22 of the foil sheet 13 is sized to fit upon and be supported by the pan annular support surface 16 as best seen in FIG. 4 The shape and area of the portion of the foil sheet 13 covered by the webs 23 is of a size and shape generally identical and similar to the size and shape of the pan 11 open area bounded by the pan annular support surface 16. The margin 22 has a fold line 32 extending all the way around the margin 22 and dividing the margin 22 into an inner annular surface which remains flat, will support the food item 12 and will cover the annular support surface 16 and the gutter 18 of pan 11, and into an outer annular surface portion which is upwardly formable into the upright peripheral flange 33 seen best in FIG. 4. The fold line 32 may be pre-scored or merely be a theoretical line about and within the margin 22. The foil sheet 13 is sized so that when the upright peripheral flange 33 is formed, the flange 33 extends at least to the top of the pan outer flange 17 and preferably just a bit higher. The foil sheet 13 is sized and shaped to provide the flange 33 around the entirety of the margin 22.

The method of cooking the food item 12, which is an important feature of the invention, involves the use of the foil sheet 13 and the pan 11, and the operation and use of these structures will be explained hereafter in the explanation of the method.

As previously mentioned, the pan 11, foil sheet 13, and food item 12 are sized to be usable with one another. Specifically, the pan 11 may have a diameter of six inches (152.5 mm) inside of the peripheral flange 17. The opening in the pan 11 may be four and twenty-five thirty-seconds inches (122 mm) and the peripheral flange 17 may extend seventeen thirty-seconds inch (13.5 mm) above the level of the annular support surface 16. The food item 12 will then be about five and seven-eighths inches (150 mm) in diameter. The foil sheet 13 will have a web 23 pattern of about four and seven-eighths inches (124 mm) and the margin outer edge 28 will be about seven inches (178 mm) in diameter. The foil sheet 13 is larger than the food item 12 by an amount at least equal to and preferably a bit greater than the height of the pan flange 17 above the annular support surface 16. As an example, the aforementioned specific size of foil sheet 13 will have an upward flange 33 of about nine-sixteenths inch (14.3 mm) when folded upward around the food item 12. This foil sheet flange 33 is at least equal to and preferably just slightly higher than the top of the pan flange 17 as is best seen in FIG. 4.

The food item 12, previously described and which may be a pizza which is either frozen or just refrigerated, is placed upon the flat foil sheet 13. The food item 12 is slightly larger than the pattern of webs 23 and completely covers the webs 23. In order to properly place the food item 12 on the webs 23, the food item 12 is visually centered within the margin outer edge 28. The foil sheet 13 and the food item 12 are then picked up by the margin 22 which is larger than the food item 12 and therefore partially exposed around the outside of the food item 12, and the foil sheet 13 and food item 12 are placed atop the pan 11. Alternately, the foil sheet 13 may first be placed atop the pan 11 and the food item 12 then placed atop the foil sheet 13. The food item 12 is then pushed down into the pan 11 and on to the annular support surface 16, such position being clearly shown in FIG. 4. During placement of the food item 12 into the pan 11, the annular portion of the margin 22 is formed upward about the fold line 32 by the wiping action of the pan outer flange 17. When the food item 12 and foil sheet 13 are in the pan 11, the foil margin 22 completely lines the pan rim 14 inner surface both on top of the annular support 16 and inside of the pan outer flange 17. The foil margin flange 33 can be seen completely surrounding the periphery of the food item 12 and lining the pan outer flange 17 in FIGS. 3 and 4.

The exposure of food item bottom 20 between the foil sheet webs 23 is illustrated in FIG. 5.

The package 10 of pan 11, foil sheet 13 and food item 12 is then placed into an oven (not shown) atop a source of infrared radiant heat. Radiant heat is directed upwardly directly against the package 10 and the radiant heat passed between the webs 23, and is applied directly against the bottom 20 of food item 12. During the time in which the package 10 is in the oven, the package 10 is preferably rotated about its axis with respect to the source of radiant heat for even application of the heat between the webs 23. An oven and structure for applying infrared radiant heat and rotating the package 10 are shown in U.S. Pat. No. 3,847,069. The bottom 20 of food item 12 is browned in the area exposed between the webs 23; this is sufficient to brown more than half of the bottom area of the food item 12.

The webs 23 also support the center of the food item 12 during cooking and prevent the food item from falling through the open-bottomed pan 11. The center of the food item 12 has been found to sag the most and the imperforate hub 29, if forced down by the weight of the sagging food item 12, will contact the surface upon which the pan 11 is sitting and prevent contact of the food item 12 against such surface. This prevents burning, sticking and tearing of the center of the food item 12. As the hub 29 is depressed by a sagging food item 12, each of the webs 23 partially supports the hub 29 and the radius sections 30 help prevent breakage between any of the webs 23 and hub 29. The radially positioned webs 23 are retained or tensioned by the entire margin 22 and the support of the center of the food item is held by the contact of the margin 22 on the pan support surface 16. Each web 23 is wider near the margin 22 and also is joined by radius section 31 which helps prevent any web 23 from breaking from the margin 22 during handling and turning of the package 10 about its axis.

During cooking, the topping 21 may partially run off of or drip from the food item 12. All such run off or drainage is collected around the perimeter of food item 12 by the foil sheet margin 22 and never contacts the cooking pan 11. As a consequence, the pan 11 never gets dirty and does not need cleaning. There is no drippage between the webs 23 because the food bottom 20 completely covers the webs 23.

After the food item 12 has been cooked and the bottom 20 has been sufficiently browned, the package 10 is discharged from the oven and the food item 12 is servable. In a typical pizza oven, the pan 11 will be about 600° F. (315° C.) and cannot be touched or easily handled. The package 10 can be automatically discharged onto a holding counter and in the present method, the pan 11 need not be handled.

The foil flange 33 is also very hot but cools almost immediately because of its thinness and low heat content. For serving of the cooked food item 12, the foil flange is manually grasped and the foil sheet 13 together with the cooked food item 12 thereon is pulled upward and outward from the hot pan 11. The foil flange 33, besides lining the pan 11, forms a graspable handle which can be manually grasped while the pan 11 is too hot to touch. During removal from the pan 11, it may be necessary to use a reasonable pulling force on the foil 13. The structural arrangement of the webs 23 prevents breakage of the webs 23 and also keeps the margin 22 from becoming egg-shaped or otherwise distorted.

The cooked food item 12 together with the foil sheet 13 after cooking and removal from the pan 11, is shown in FIG. 6. The foil margin 22 may be grasped on opposite sides and the food item 12 so carried by the foil sheet 13. The foil sheet 13 and food item may be placed on a counter (not shown) and the food item may be sliced or scored into smaller pieces while still on the foil sheet 13. For saving time and effort, the food item 12 may be served while on and with the foil sheet 13. This eliminates the need for any additional serving ware.

The cooking pan 11, after cooling, may then be immediately re-used with a new foil sheet 13 and food item 12. There is no need to wash the pan 11 as it was never in contact with the food item 12 or any drippage from the cooked food item 12. After the food item 12 is consumed, the foil sheet 13 used thereunder is disposed of. The foregoing cooking sheet 13 and method have been found to be a great improvement over the past practice of cooking and serving food in an imperforate rigid pan or a piece of imperforate foil. The previous pans either required washing or if disposable were very costly when compared to the present disposable cooking sheet 13. This new method is also extremely sanitary and saves a tremendous amount of time. The problem of soggy food cooked on an imperforate sheet of foil is also solved and eliminated.

Although various minor modifications may be suggested by those versed in the art, it should be understood that I wish to embody within the scope of the patent warranted hereon all such embodiments as reasonably come within the scope of my contribution to the art.

I claim as my invention:

1. A method of cooking an item of food comprising the steps of:
    a. providing an initially flat sheet of soft metal wrapping foil, said foil sheet being manually flexible and having a perforated central portion atop which an item of food may be placed;
    b. providing an open-bottomed rigid pan of lesser size than the foil sheet, said pan being provided with an annular inner bottom rim for supporting the foil sheet and an item of food upon the foil sheet, and an outer upright peripheral flange for positioning a food item upon the annular inner rim;
    c. providing an item of food to be cooked while on the foil and in the pan, said item of food having a bottom made of bread;
    d. placing both the foil sheet and the item of food atop of and on the pan with the bread bottom of the food item being placed against the perforated central portion of the foil sheet;
    e. pushing the food item and the foil sheet down into the pan; while simultaneously
    f. wiping a margin of the foil sheet against the outer flange of the pan and simultaneously forming an outer portion of the foil sheet margin upwardly about and around the food item so that there is an upright margin flange between the food item and the pan outer flange; then
    g. placing the pan, foil sheet and food item together as a package into an oven;
    h. applying infra-red radiant heat upwardly through the perforations of the foil sheet and directly against at least part of the bread bottom of the food item; and
    i. browning a portion of the bread bottom while cooking the food item; then
    j. discharging the package from the oven after cooking the food to an extent required to prepare it for consumption; and then simultaneously
    k. removing the foil sheet and the food item from the pan.

2. A method according to claim 1, including the further step of forming the foil sheet margin flange at least to the top of the pan outer flange so that the foil margin lines the entire inner surface of the pan.

3. A method according to claim 1, including the further step of rotating the package with respect to a source of the infrared radiant heat, for evening of the application of infrared radiant heat through the perforations of the foil sheet and against the bread bottom.

4. A method according to claim 2, including the further steps of
    a. forming the foil sheet margin flange so that it extends higher than the top of the pan outer flange during said wiping step, and then
    b. manually grasping and pulling and formed flange and pulling both the foil sheet and the cooked food item thereon from the pan during the step of removal from the pan.

* * * * *